R. A. WOOD.
RAT TRAP.
APPLICATION FILED MAR. 30, 1914.
1,191,550.
Patented July 18, 1916.
2 SHEETS—SHEET 2.
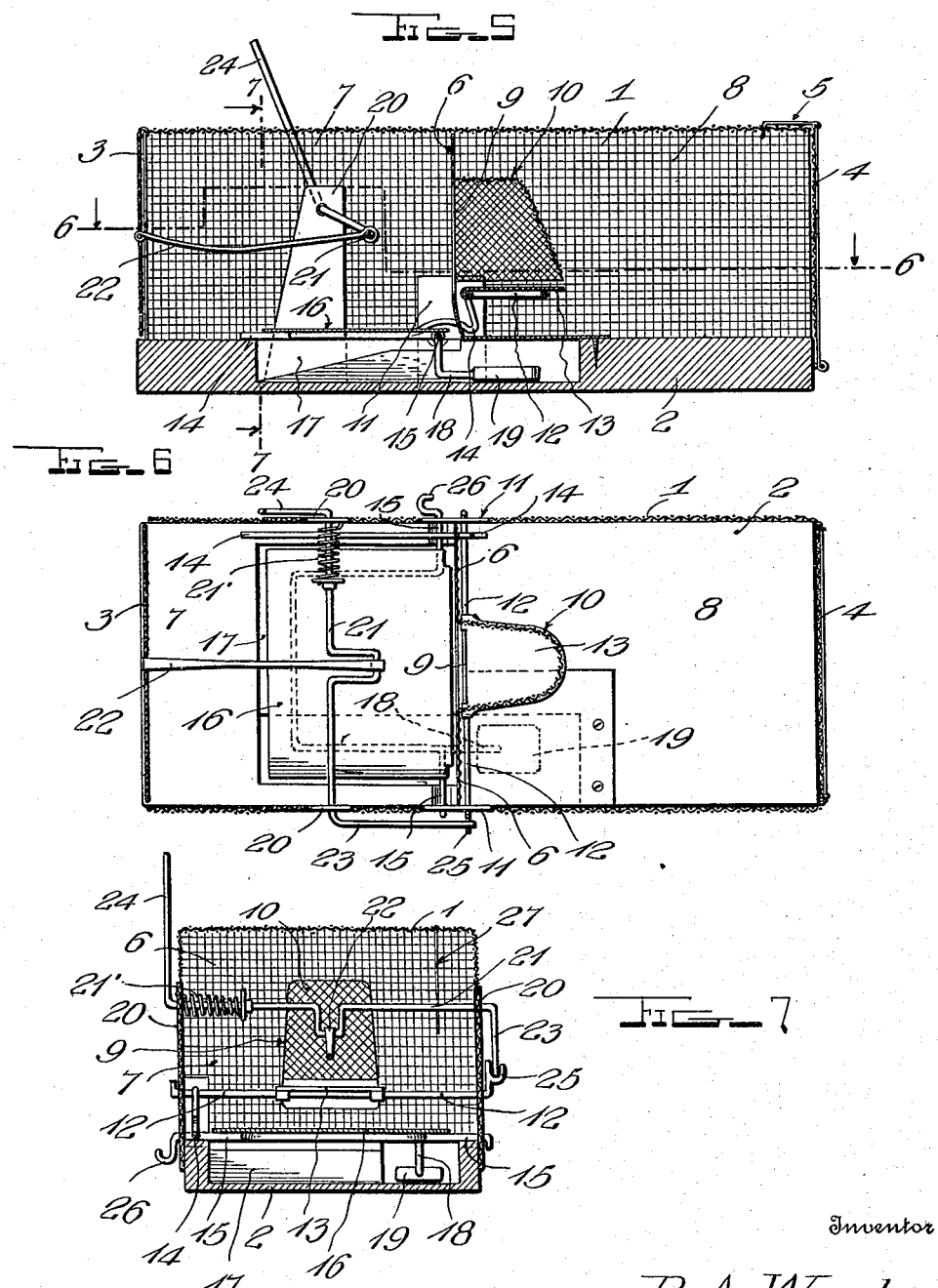

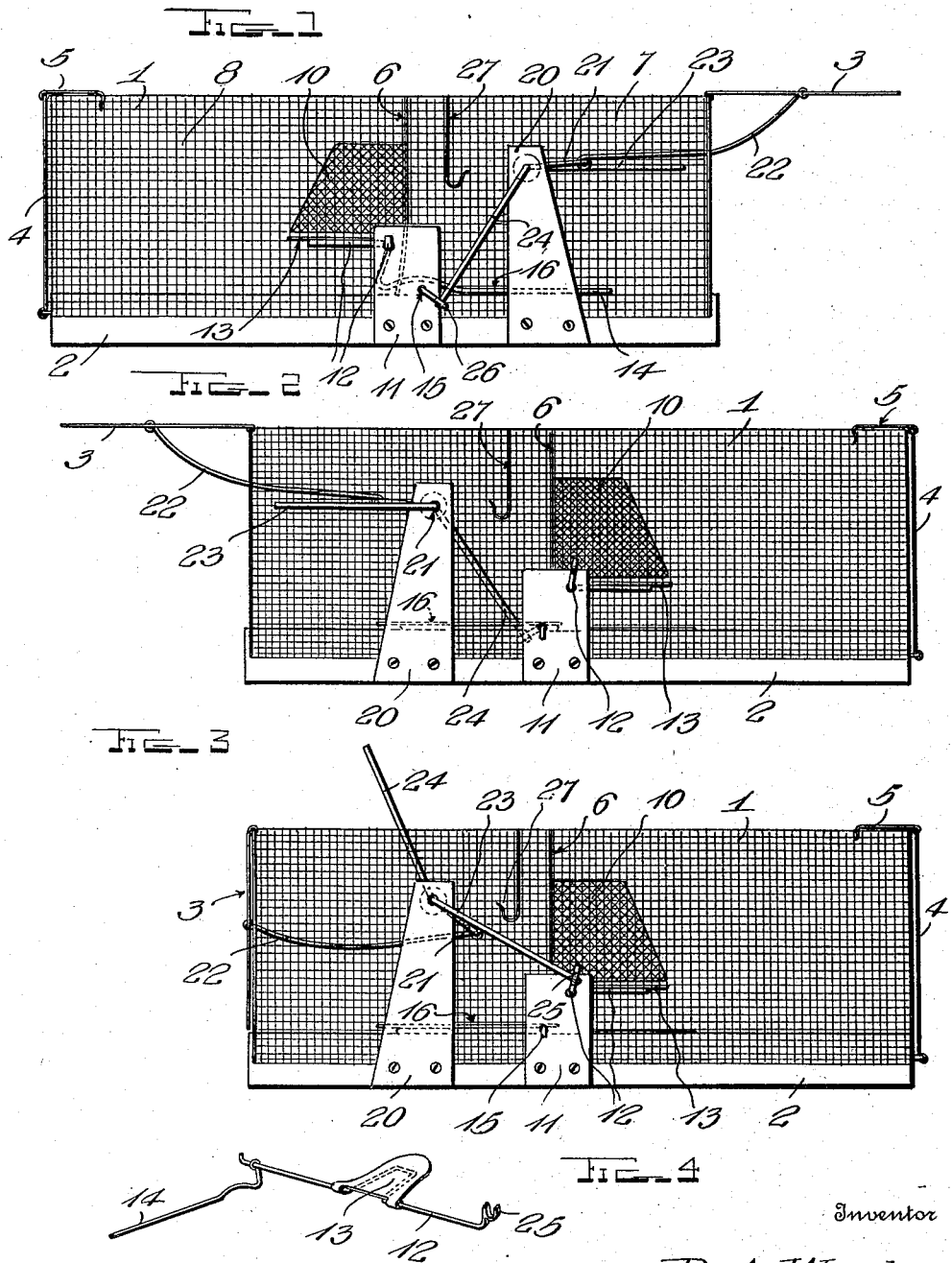

UNITED STATES PATENT OFFICE.

ROSEBERT A. WOOD, OF PENNINGTON GAP, VIRGINIA.

RAT-TRAP.

1,191,550.  Specification of Letters Patent.  Patented July 18, 1916.

Application filed March 30, 1914. Serial No. 828,325.

*To all whom it may concern:*

Be it known that I, ROSEBERT A. WOOD, a citizen of the United States, residing at Pennington Gap, in the county of Lee and State of Virginia, have invented certain new and useful Improvements in Rat-Traps; and I do declare the following to be a full, clear, and exact description of the invention, such as will enable others skilled in the art to which it appertains to make and use the same.

This invention relates to new and useful improvements in animal traps and more especially to a device intended for use as a rat trap, and the primary object of the invention is to provide what is known as a self-setting or automatic trap, wherein the completion of the entrapping of one animal, actuates or sets the device for entrapping another.

A further object of the invention resides in providing an improved structure which is simple and durable in construction, inexpensive to manufacture, and one which will be very efficient in use.

With these and other objects in view, my invention consists in the novel features of construction, combination and arrangement of parts as will be hereinafter referred to and more particularly pointed out in the specification and claim.

In the accompanying drawings, forming a part of this application: Figure 1 is a side elevation of a trap constructed in accordance with my invention; Fig. 2 is an opposite side elevation thereof; Fig. 3 is a view similar to Fig. 2, disclosing the entrance door in its closed position; Fig. 4 is a detail perspective view of one of the trap operating mechanisms; Fig. 5 is a vertical longitudinal section through the device; Fig. 6 is a horizontal section therethrough as seen on line 6—6 of Fig. 5; and Fig. 7 is a vertical transverse section through the device as seen on line 7—7 of Fig. 5.

In describing the invention, I shall refer to the drawings in which similar reference characters designate corresponding parts throughout the several views, and in which—

1 indicates a cage or other inclosure having the top, end and side walls thereof formed of wire mesh or the like and the bottom 2 thereof formed of a solid material. The bottom 2 of the cage is formed of a rectangular-shaped block formed preferably of wood, that forms a base for the wire mesh top, end and side walls of the cage. The end walls of this device form doors or the like indicated as 3 and 4, respectively, the former being hinged at its upper end and closing the entrance opening of the device, while the latter is hinged at its lower end and forms a rear end opening for the cage. Hook members 5 are provided in connection with the door 4 to secure the latter in its raised and closed position and an improved means is provided in connection with the door 3 for opening and closing the same, which means will be hereinafter and more particularly set forth.

Arranged about centrally of the cage or inclosure is a partition wall 6 formed preferably of wire mesh and dividing the inclosure into a pair of compartments indicated in the drawings as 7 and 8 respectively. The compartment 7 is indicated as the outer and the compartment 8 as the inner compartment and the partition wall 6 is provided with an opening 9 which affords communication between said compartments. Encircling the opening 9 and projecting into the compartment 8 is a hood or canopy 10 formed also of wire mesh and providing substantially a chamber or passage-way extending from the opening 6.

Secured to the sides of the bottom 2 about midway of the ends thereof and projecting therefrom are the bearing plates 11 in which are mounted the ends of an oscillating or rock shaft 12. This rock shaft has the portion intermediate of its ends bowed laterally to provide a treadle supporting loop and mounted on this loop of the shaft is a plate 13 which is designed to form a bottom for the passage-way or chamber formed by said hood 10. The outer end of this plate is adapted to be disposed in close proximity to the lower edges of this hood or canopy 10 when the shaft 12 is swung in one direction and in order to normally position this plate adjacent the lower edge of said hood, a weighted arm 14 is mounted on said rock shaft 12, the same being hooked or curved at its engaging end and projecting within the outer compartment 7 adjacent one side thereof. This plate 13 which forms a bottom for the chamber or passage-way projecting from the opening 6 forms a treadle or the like, as will be hereinafter and more particularly set forth. Also mounted for oscillation in the bearing plates 11 in a plane below the plane of the shaft 12 is an additional rock shaft 15, the same being provided with a crank formation or loop intermediate of its ends to which is secured an additional plate or platform 16. The base or bottom 2 of the cage or inclosure 1 is provided with a recess or cavity 17 into which this platform or plate 16 is adapted to be received when disposed downwardly, inasmuch as the shaft 15 is disposed in a plane just above the plane of the upper face of said bottom. Carried on the shaft 15 and projecting substantially rearward thereof is an angular arm 18 which carries thereon a weight 19, the latter being disposed within the cavity 17. The normal position of this weight is, of course, in contact with the bottom or floor of the cavity or recess 17, thus rocking the shaft 15 in a position to dispose the platform 16 normally in its raised position. This normal position of the platform is in a plane just above the plane of the top face of the floor or base 2 of the device, so as to be readily engaged by an animal entering the device. This platform, therefore, forms a treadle, as will be hereinafter and more particularly set forth. Also secured to the side edges of the base or platform 2 of the cage or inclosure forward of the bearing plates 11 are the additional vertically arranged bearing plates 20 which extend upwardly to a plane adjacent the top of said cage. Mounted for rotation in these bearing plates is a crank shaft 21, the crank portion of which has a pitman or the like 22 connected therewith, the outer end of said pitman being connected with the door 3 which is designed to close the entrance opening of the inclosure or cage 1. Formed on the ends of this crank shaft 23 are the oppositely bent crank arms 23 and 24. Formed on one end of the oscillating or rock shaft 12 is a keeper 25 which, in the normal position of said shaft, is disposed in the rotatting path of the crank arm 23, whereby to receive the latter in engagement therewith at certain times in the operation of the device. The construction of the device is such, however, that when the shaft 12 is rocked, said keeper will be disposed out of the rotating path of said crank arm. The end of the additional rock shaft 15 on the opposite side of the device is also provided with an additional keeper 26 which, in the normal position of said shaft 15, is in the rotating path of said crank arm 24, so as to engage the outer end of the latter at certain times in the operation of the device. This keeper also is adapted to be disposed out of the rotating path of said crank arm 24 when the shaft 15 is rocked by the actuation of the treadle or platform 16.

A coil spring 21' encircles a portion of the crank shaft 21 and has one end thereof engaged with said crank shaft, while the opposite end of the same is secured in engagement with one of the bearing plates 20. It will be seen that the tension of this spring may be increased by winding the crank shaft 21 and the normal tendency of said spring is to rotate said shaft in one direction, as will be hereinafter and more particularly set forth in the description of the operation of the device. Engaged with the top of the cage or inclosure over the outer compartment 7, is a bait hook 27 which is preferably so disposed as not to be reached by an animal after entering the inclosure. The same is disposed, however, so as to be alluring to the animal.

In operation, assuming that the device is completely set up for operation and set to entrap an animal, it will be seen that the door 3 at the entrance opening of the device will be held in its open and raised position by the engagement of the outer end of the crank arm 24 with the keeper 26. As an animal is lured to the trap and enters the same, it will step upon the treadle or platform 16, thereby rocking the shaft 15 to which the same is connected. Upon such rocking of the shaft, the keeper 26 will be disposed out of engagement with the crank arm 24 and the crank shaft 21 will be partially rotated under tension of the coil spring 21'. Upon such partial rotation of the crank shaft 21, the door 3 will be disposed to its closed position and the crank arm 23 will also be disposed to a position in engagement with the keeper 25 on the shaft 12. The animal will, of course, then be entirely inclosed in the outer compartment 7, and it will find no means of escape except through the opening 6 leading to the chamber formed by the hood or canopy 10. In making its escape through this opening, the animal will step upon the treadle or plate 13 causing the shaft 12 to be rocked in its bearings. The animal will, of course, drop to the inner compartment 8 and will be entirely entrapped therein. The rocking of the shaft 12 disengages the keeper 25 from the outer end of the crank arm 21 to be partially rotated under the tension of the coil spring 21'. This partial rotation of the crank shaft will again dispose the door 3 to its raised and open position and the outer end of the crank arm 24 will again be engaged with the keeper 26, which is disposed to its initial position immediately upon the release of pressure from the treadle or platform 16. The animal is, therefore, completely entrapped, and the device automatically set for the entrance of another animal thereto. It will be appreciated that immediately upon the entrance of the animal to the second or inner compartment 8, the treadle or plate 13 will be returned to its initial and closed position under the weight of the arm 14. The animal may not, therefore, find a means of escape from the compartment 8.

It will be seen from the above description of the construction and operation of my improved device, that the same will be extremely efficient in carrying out the purposes for which the same is designed, and it will further be seen that the same is self-setting upon the entrapping of an animal therein. Furthermore, it will be seen that the device is simple and durable in construction, inexpensive to manufacture, and one which will be very efficient and useful in operation.

While I have particularly described the elements best adapted to perform the functions set forth, it is obvious that various changes in form, proportion, and in the minor details of construction, may be resorted to within the scope of the appended claim, without departing from the spirit or sacrificing any of the principles of the invention.

Having thus described my invention, what I claim is:

The herein described animal trap comprising a body having a rectangular-shaped block forming a base, said block having a large cavity in its top projecting from one side of the transverse center of the same and a small cavity communicating with the large cavity and extending at the opposite side of the transverse center adjacent one side edge of the block, a plate covering said smaller cavity, a partition at the center of said body, a hooded opening in said partition, a pair of opposed upwardly projecting metal plates secured to the side edges of said block at the ends of the partition and having two sets of pivot openings therethrough, a treadle substantially covering said large cavity, a rock shaft mounted in said plates through one of the sets of pivot openings and supporting the treadle, an L-shaped weighted arm projecting from said shaft and positioned in the smaller cavity, a treadle beneath said hooded opening in the partition, a second rock shaft mounted through the other set of pivot openings in the plates and supporting said treadle, a weighted arm on said shaft, an additional pair of metal plates secured to the side edges of the block adjacent one end of the body and extending upwardly a distance greater than the height of the first mentioned plates, a door controlling shaft mounted through pivot openings adjacent the upper end of said last mentioned plates, an operating spring on the shaft having one end secured to the same and the other to a side of said body, and connections between said shafts and the rock shafts whereby the door controlling shaft will be intermittently rotated a limited distance upon alternate depression of the treadles.

In testimony whereof I have hereunto set my hand in presence of two subscribing witnesses.

ROSEBERT A. WOOD.

Witnesses:
E. V. SKIDMORE,
R. L. WOOD.

Copies of this patent may be obtained for five cents each, by addressing the "Commissioner of Patents, Washington, D. C."